United States Patent [19]

Sakagami

[11] 4,300,839
[45] Nov. 17, 1981

[54] SELF-CLEANING TYPE EXTRUDER

[75] Inventor: Mamoru Sakagami, Ibaraki, Japan

[73] Assignee: Sekisui Kagaku Kogyo Kabushiki Kaisha, Osaka, Japan

[21] Appl. No.: 143,473

[22] PCT Filed: Nov. 16, 1978

[86] PCT No.: PCT/JP78/00028
§ 371 Date: Jul. 19, 1979
§ 102(e) Date: Jun. 28, 1979

[87] PCT Pub. No.: WO79/00305
PCT Pub. Date: May 31, 1979

[30] Foreign Application Priority Data

Nov. 19, 1977 [JP] Japan .................. 52-139248

[51] Int. Cl.³ .............................. B29B 1/10
[52] U.S. Cl. ................................... 366/85
[58] Field of Search ............... 366/85, 301; 425/204

[56] References Cited

U.S. PATENT DOCUMENTS 3,104,420  9/1963  Selbach ............................ 366/85
3,900,187  8/1975  Loomans ........................... 366/85
4,131,371 12/1978  Tynan ............................... 366/301

FOREIGN PATENT DOCUMENTS 14109   9/1956  Fed. Rep. of Germany ...... 425/204
1359672 7/1974  United Kingdom ............... 425/204

Primary Examiner—Philip R. Coe
Attorney, Agent, or Firm—Wenderoth, Lind & Ponack

[57] ABSTRACT

This invention relates to a self-cleaning type extruder including a cylinder and at least two screws therein adapted to rotate in the same direction, the screws being in such a relation that at any position in at least a part of the screws which lies in the longitudinal direction of the extruder, the contour of one screw in a cylinder cross-section taken at right angles to the screw axes is in substantial contact at one point with the contour in the same cross-section of another screw intermeshing therewith. A conventional self-cleaning type extruder lacks the ability to knead a resin stock uniformly and sufficiently. This defect of the prior extruder is removed in accordance with the present invention by improving the aforesaid self-cleaning type extruder in such a way that each of the screws has at least two screw flights, and the top of at least one of the screw flights is substantially in contact with the inner wall surface of the cylinder and the top of at least one other screw flight has a predetermined tip clearance with respect to the inner wall surface of the cylinder. The extruder of this invention can achieve uniform and powerful kneading and melting of the resin stock.

5 Claims, 8 Drawing Figures

SELF-CLEANING TYPE EXTRUDER

TECHNICAL FIELD

This invention relates to a novel and improved multi-screw extruder, and more specifically, to a self-cleaning type extruder having multiple screws rotating in the same direction which has been improved so as to achieve uniform and intensive kneading of plastics.

BACKGROUND ART

A self-cleaning type kneading extruder is known in which the surfaces of multiple intermeshing screws are cleaned by contact with each other or with screw flights. Extruders of this type have the function of removing the fluctuations in output, or the rate of stock extrusion, which are caused by blocking or powders in a solid-conveying zone and/or plasticizing zone, and of preventing the degradation of the extrudate caused by the sticking or flowing out of the degeneration products in a melt-conveying zone, and have recently attained importance for use in plasticizing, melting and kneading of polymeric materials and their compositions.

Generally, a "self-cleaning type" extruder has a specified configuration defined by the contour of screws in a cross section at right angles to their axes. It includes at least two screws adapted to rotate in the same direction each of which has one or multiple screw flights, and which are in such a relation that at any position in at least a part of the screws which lies in the longitudinal direction of the extruder, the contour of one screw in a cylinder cross-section taken at right angles to the screw axis is in substantial contact at one point with the contour in the same cross-section of another screw intermeshing therewith.

FIG. 1(A) of the attached drawings is a top plan view of the screw section of a typical known self-cleaning type twin-screw extruder in which each screw $S_1$ or $S_2$ has three flights $F_1$, $F_2$ and $F_3$. The cross-section of these screws $S_1$ and $S_2$ at a certain point in the longitudinal direction, for example, the cross-section taken along the line I—I of FIG. 1(A), is as shown in FIG. 1(B). It is appreciated from this drawing that the contour of the cross section of screw $S_1$ is in contact with that of screw $S_2$ at one point only.

The tops $T_1$, $T_2$ and $T_3$ of screw flights $F_1$, $F_2$ and $F_3$ for each screw $S_1$ or $S_2$ in the known self-cleaning type extruders make substantial contact with the inner wall surface of cylinder C, and each screw channel $A_1$, $A_2$, . . . $A_{12}$ or $B_1$, $B_2$, . . . $B_9$ forms a space substantially completely isolated from the neighboring channels. Accordingly, the stock fed into channel $A_1$ of screw $S_2$ necessarily moves to channel $B_1$ of screw $S_1$ during the rotation of the screws. Then, it moves to channel $A_6$ of screw $S_2$, further passes channel $B_6$ of screw $S_1$, and channel $A_{11}$ of screw $S_2$. The stock fed into channel $A_2$ of screw $S_2$ is likewise conveyed through the channels $A_2 \rightarrow B_2 \rightarrow A_7 \rightarrow B_7 \rightarrow A_{12}$.

Thus, in the conventional self-cleaning type extruder, the flow path of the stock is completely dependent on the screw channel into which the stock has initially been fed. As described above, the stock which has flowed into the channel $A_1$ of screw $S_2$ follows figure 8-patterned helical path $A_1 \rightarrow B_1 \rightarrow A_6 \rightarrow B_6 \rightarrow A_{11}$. Hence, the resin which has flowed into channel $A_1$, either partly or wholly, never gets together with the stock within the channels $A_2$, $A_3$, $A_4$, $A_5$, $B_2$, $B_3$, $B_4$, and $B_5$. In other words, no exchange of stock takes place between channels of one screw and between channels of two intermeshing screws.

Since there is no exchange of the stock between channels in the axial direction of screws in the known self-cleaning type kneading extruder, it has the defect of having insufficient ability to knead and or disperse the resin fed into it.

In an attempt to remedy this defect, it has been suggested in the past to provide the extruder with, besides the feeding screws, kneading discs which are triangular and force side-to-side transfer while kneading and shearing the resin (see SPE Journal, September 1969, pages 1147–1154). However, in this suggested extruder, exchange of the resin between channels is performed only through a limited length at a fixed position in the axial direction of the screws. Consequently, the resin undergoes an abrupt physical action within a short period of time, which frequently produces undesirable results. These discs of the suggested extruder do not have the power of conveying the stock forward, and therefore, the overall conveying power is reduced.

It would be worthwhile here to consider the shearing action of the screw flights in the above conventional self-cleaning type extruder. Generally, the magnitude of the shearing force of a screw independent of the properties of the stock and the operating conditions is given by the product of the average shear rate (velocity gradient) and the time. Since the time depends upon the various dimensions of the screws in the axial direction, the shear rate at the wall surface will be a representative parameter of the shearing action which is associated with the shape of the extruder in its cross section at right angles to its axis.

The shear rate ($\dot{r}_\omega$) at the wall surface is generally proportional to R/H [$\dot{r}_\omega \alpha$ R/H]. R represents the outside diameter of each screw, and H represents the depth of a screw channel. If the distance between the axial cores of two intermeshing screws is L, then the following equation can be derived because H = R − L.

$$\dot{r}_\omega \alpha \frac{R}{R-L} = \frac{1}{1 - L/R} \quad (1)$$

As is clearly seen from equation (1), the shear rate at the wall surface increases when the distance L between the axial cores of the screws approaches the outside diameter (R) of the screw flight and thus the depth (H) of the screw channel decreases. On the other hand, with decreasing depth (H) of the screw channel, the volume of the intermeshing part of the screws decreases, and consequently, the time during which the stock undergoes a shearing action decreases. This leads to the reduction of the resin kneading action and a drastic decrease of the output.

The screw flights of the multiple screws of the aforesaid known self-cleaning type extruder have the same outside diameter (R). If R and L are constant, then the depth H (= R − L) of a channel is determined unequivocally, and therefore, the wall-surface shear rate is also determined unequivocally. This means that in order to obtain a high shear at a given rotating speed of screws in the known self-cleaning type extruder, it is necessary to decrease the outside diameter R of the screw flight as compared with the distance L between the axial cores of two intermeshing screws, namely to decrease the depth of the screw channel. If this is done, however, the resin kneading action of the screws will be reduced, and the rate of extrusion of the resin will be drastically decreased, as stated hereinabove. In other words, the conventional self-cleaning type extruders have the serious defect that in order to attain a high shear rate at the wall surface, the kneading action, the resin conveying efficiency, and the rate of extrusion or output must be sacrificed.

DISCLOSURE OF THE INVENTION

It is an object of this invention to provide a novel and improved self-cleaning type extruder which is free from the aforesaid defects.

Another object of this invention is to provide a self-cleaning type extruder which produces a great resin kneading action at the intermeshing parts of screws and gives a high rate of extrusion while maintaining a high shearing action.

Still another object of this invention is to provide a self-cleaning type extruder capable of achieving uniform and intensive kneading of plastics while retaining the advantages of self-cleaning type extruders, by performing a mutual kneading action based on the exchange of resin between adjacent screw channels in the axial direction the screws and between screw channels of two intermeshing screws, and attaining a high shearing action between the wall surface of the cylinder and the bottom surface of the screw channels.

Other objects and advantages of this invention will become apparent from the following description.

According to this invention, there is provided a self-cleaning type extruder including a cylinder and at least two screws therein adapted to rotate in the same direction, said screws being in such a relation that at any position in at least a part of the screws which lies in the longitudinal direction of the extruder, the contour of one screw in a cylinder cross-section taken at right angles to the screw axes is in substantial contact at one point with the contour in the same cross-section of another screw intermeshing therewith; wherein each of said screws has at least two screw flights, and the top of at least one of the screw flights is substantially in contact with the inner wall surface of the cylinder and the top of at least one other screw flight has a predetermined tip clearance with respect to the inner wall surface of the cylinder.

The extruder of the invention will now be described in greater detail by referring to some embodiments shown in the accompanying drawings.

BEST MODE FOR PRACTICING THE INVENTION

The screws used in the extruder of the invention have at least two screw flights. In theory, any number of flights can be provided, but the invention preferably screws each having two to four flights.

The multiple screws incorporated in the extruder of this invention usually have the same outside diameter. But they may have different outside diameters from each other. The extruder of this invention may have at least two, and usually has only two, such screws.

Figure 2B:
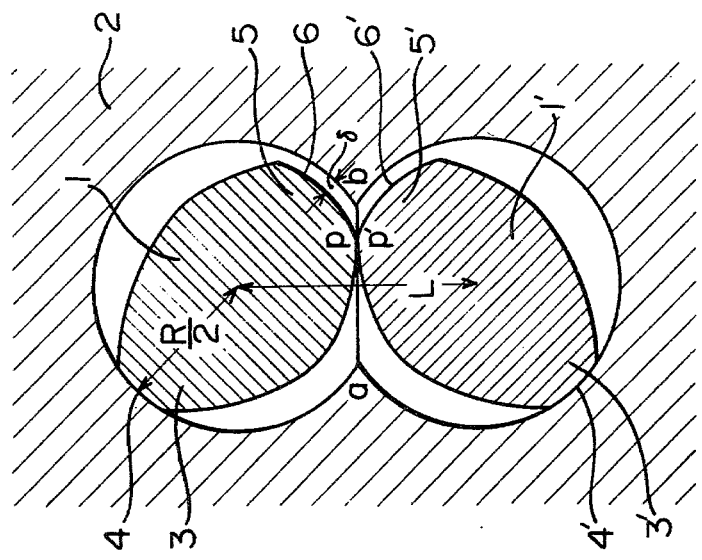
FIG. 2(B) is a cross-sectional view taken along the line II—II of FIG. 2(A)
Figure 1B:
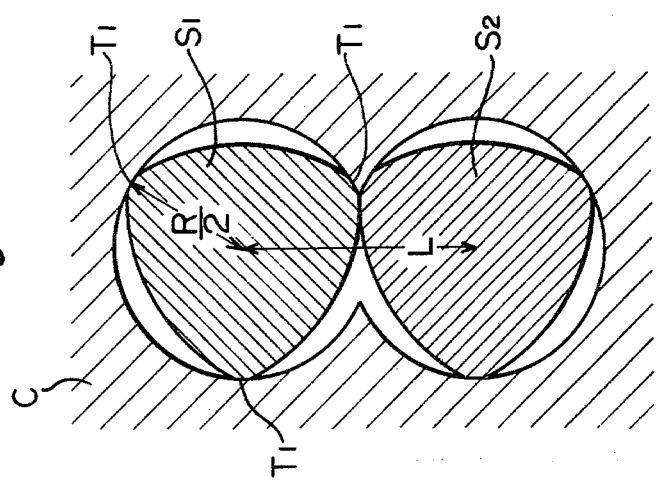
FIG. 1(B) is a cross-sectional view taken along the line I—I of FIG. 1(A)
Figure 2A:
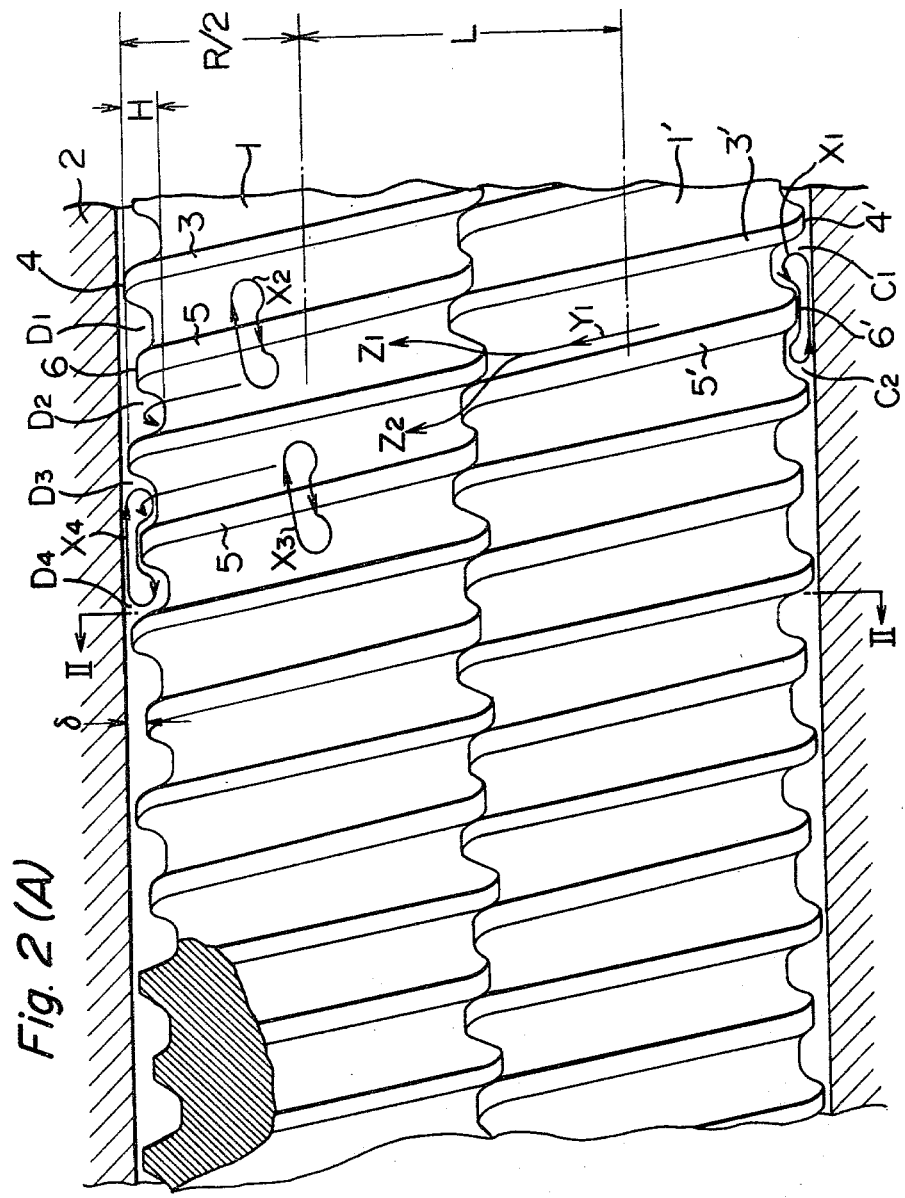
FIG. 2(A) is a top plan, partly in section, of the screw section of one embodiment of the extruder of the invention.

FIG. 2(A) shows an embodiment of the self-cleaning type extruder of the invention which has two screws 1 and 1' of the same outside diameter each having two screw flights. The screws 1 and 1' respectively have flights 3 and 3' the tops 4 and 4' of which are in substantial contact with the inner wall surface of a cylinder 2, and flights 5 and 5' the tops 6 and 6' of which are spaced from the inner wall surface of the cylinder 2 by a predetermined tip clearance $\delta$. As is clearly seen from FIG. 2(B) which shows the cross-sections of the screws 1 and 1', the cross-sectional shapes of the screws 1 and 1' are in a mirror-image relationship to each other. In any rotational transition phase, the cross-sectional contour of the screw 1 is in substantial contact with that of the screw 1' only at one point. The cross-sectional shapes of the screws 1 and 1' are usually designed in such a manner that the contact point p (p') falls on a line connecting crests a and b of the cylinder 2.

It should be understood that the term "in substantial contact" used in the present specification and the appended claims means that two elements are in slidable frictional contact with each other, or the two elements face each other with such substantially no small gap therebetween that a resin to be kneaded and extruded passes through it.

Figure 3:
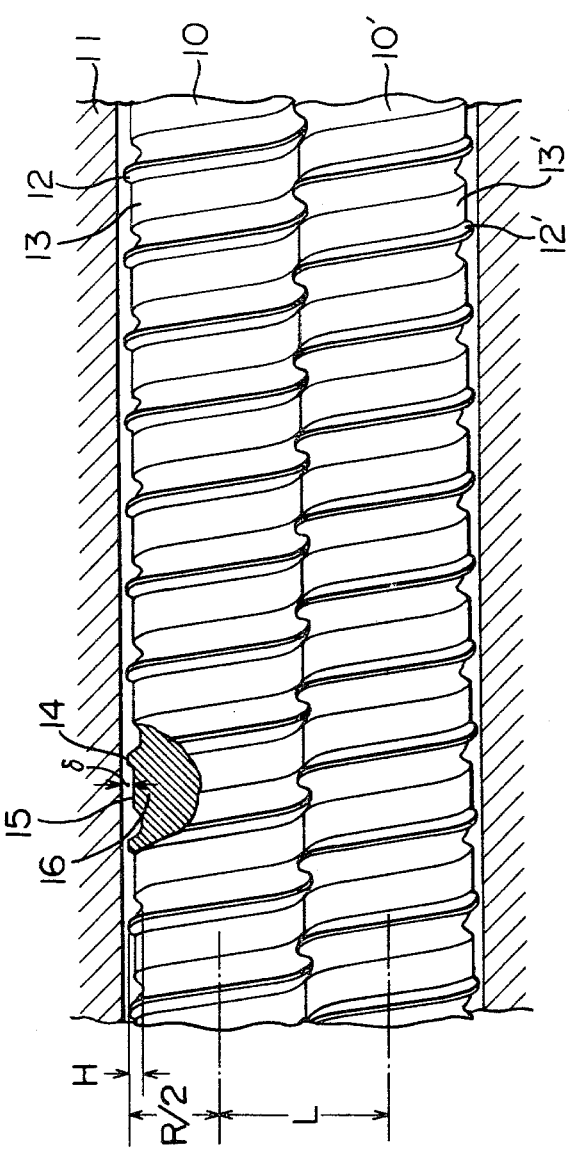
FIG. 3 is a top plan, partly in section, of the screw section of another embodiment of the extruder of this invention.

Another and a especially preferred embodiment of the invention is shown in FIG. 3. The extruder in this embodiment has two screws of the same outside diameter as shown in FIGS. 2(A) and (B) each of which has two flights. The difference is that while two screw flights exist independently from each other on each screw in the embodiment shown in FIGS. 2(A) and (B), the two screw flights on each screw in the embodiment of FIG. 3 are together and appear to form one irregularly-shaped screw flight. As is clearly appreciated from FIG. 3, the extruder in this embodiment includes two screws 10 and 10' each of which has two screw flights 12 and 13 or 12' and 13' respectively. It can be seen from FIG. 3 that the two flights are combined in an integrated screw flight 16 having a top 14 in substantial contact with the inner wall surface of a cylinder 11 and a plateau 15 spaced from the inner wall surface of the cylinder 11 by a predetermined tip clearance $\delta$.

In the embodiment shown in FIG. 3, in a cross-section of the screws taken at right angles to the screw axes in the longitudinal direction of the extruder, the contour of screw 10 is in substantial contact with that of screw 10' only at one point, and the tip clearance in FIG. 3 corresponds to the one obtained by adjusting the tip clearance $\delta$ of the screw flights 5 and 5' of screws 1 and 1' of the extruder shown in FIG. 2 to a half $[\delta = H/2 = (R-L)/2]$ of the depth $(H=R-L)$ of the screw channel. In other words, this screw flight has a special shape having the largest possible tip clearance $\delta$.

Figure 4:
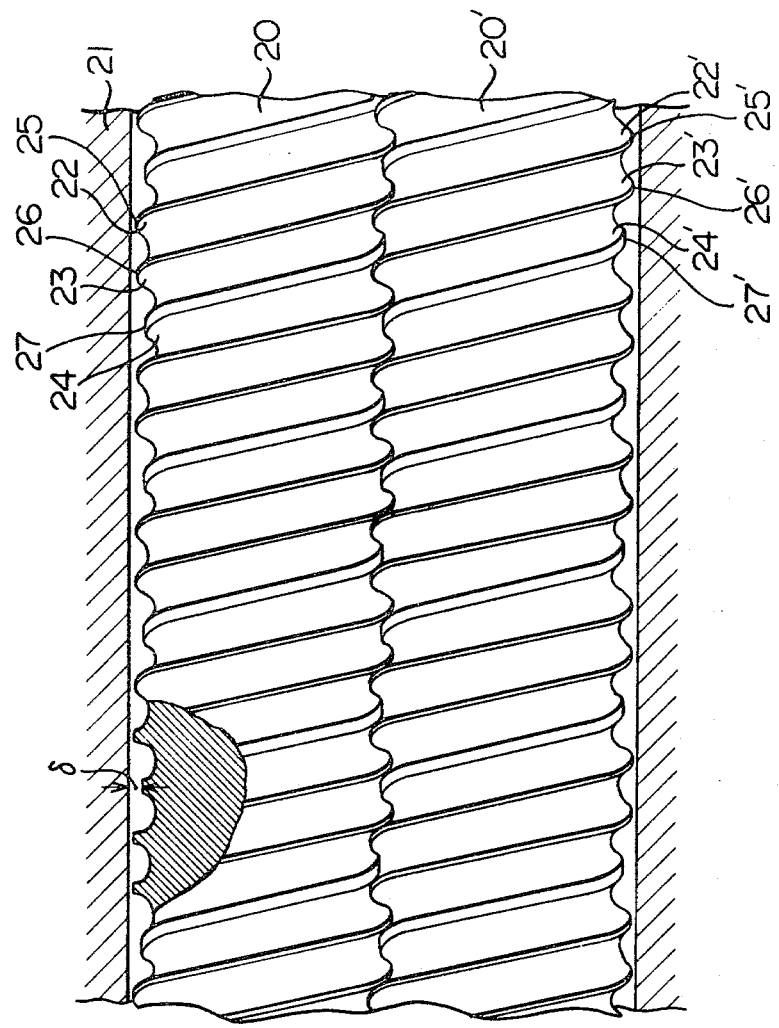
FIG. 4 is a top plan, partly in section, of the screw section of still another embodiment of the extruder of this invention.

Still another embodiment of this invention is shown in FIG. 4. The extruder shown in FIG. 4 includes two screws 20 and 20' each of which has three flights 22, 23 and 24, and 22', 23' and 24', respectively. Each of tops 27 and 27' of flights 24 and 24' has a tip clearance δ with respect to the inner wall surface of a cylinder 21, and the remaining tops 25 and 26, and 25' and 26' of the flights 22 and 23 and 22' and 23' are in substantial contact with the inner wall surface of the cylinder 21.

While in FIG. 4, only one of three flights has a tip clearance with respect to the inner wall surface of the cylinder, the invention is in no way limited to this specific embodiment. It is possible to design the screws such that tops of the two flights out of three have tip clearances with respect to the inner wall surface of the cylinder. The tip clearances of the two flights may be the same or different.

The tip clearance δ in the present invention is not strictly limited, and can be varied widely according to the use of the extruder, etc. Advantageously, it is within the following ranges with regard to the outside diameter (R) of the screw and the depth H (=R−L) of a screw channel defined by the interaxial distance L of the intermeshing screws.

$$R/100 \leq \delta \leq \tfrac{1}{3}H$$

preferably $$R/50 \leq \delta \leq \tfrac{1}{5}H$$

In the present specification, the "outside diameter" of a screw denotes the product obtained by doubling the maximum vertical distance from the top of the screw flight to the central axis of the screw.

As stated hereinabove, the extruder of the invention is essentially characterized by the configuration of screws incorporated in it. The screws used in this invention should have such a structure that at any position in at least a part of the screws which lies in the longitudinal direction of the extruder, the contour of one screw in a cylinder cross-section taken at right angles to the screw axes is in substantial contact at one point with the contour in the same cross-section of another screw intermeshing therewith. Each screw should have at least two screw flights, and the top of at least one of the flights is in substantial contact with the inner wall surface of a cylinder of the extruder, while the top of at least one other screw has a certain tip clearance with respect to the inner wall surface of the cylinder.

Any one skilled in the art is believed to be able to design screws which meet the above requirements on the basis of the disclosure of the present specification. The way of designing the cross-sectional structure of screws used in an extruder including two screws of the same outside diameter each of which has two flights in accordance with the embodiment shown in FIGS. 2(A) and (B) is described in greater detail below. Needless to say, screws in accordance with the other embodiments of the invention can be designed in quite the same way.

Figure 5A:
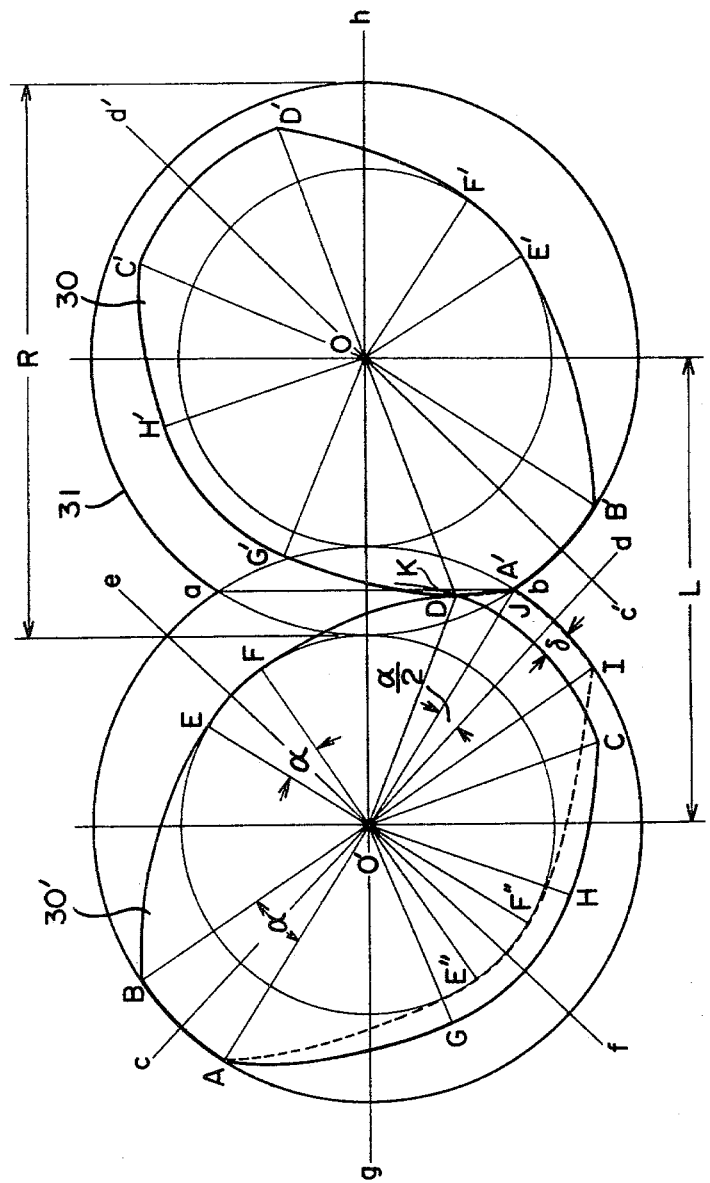
FIGS. 5(A) and (B) are views showing the contours of screws in a cylinder cross-section taken at right angles to the screw axes in an extruder of this invention including two flights per screw.
Figure 5:
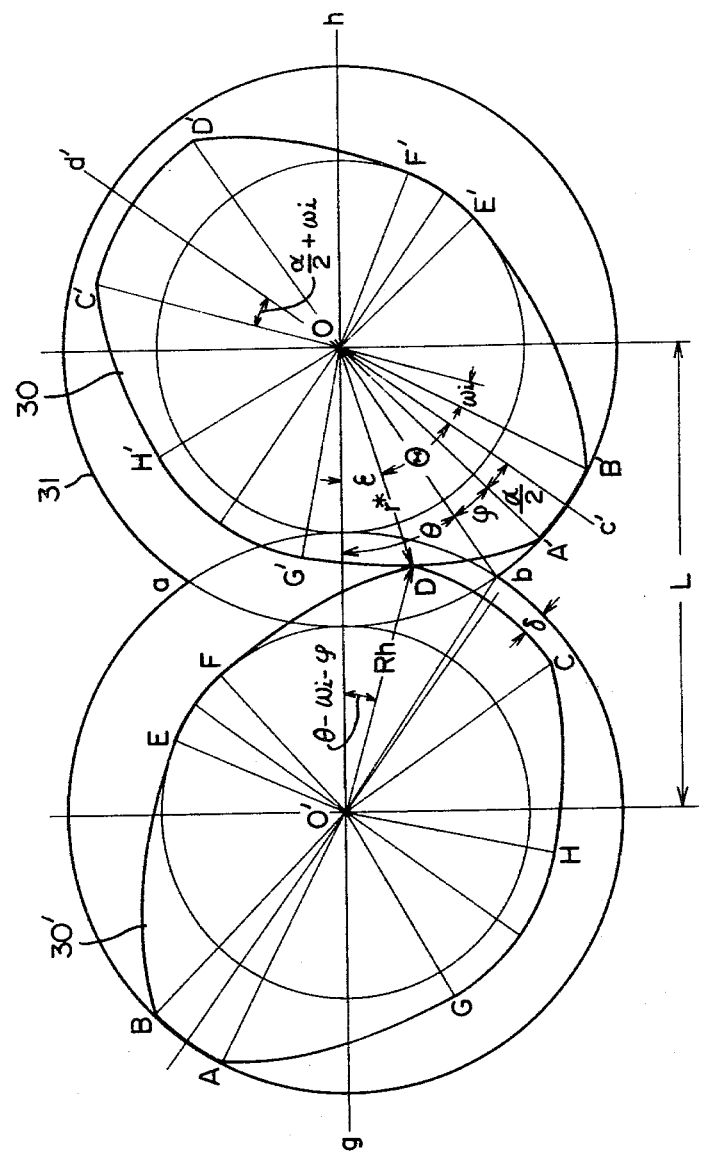

The contours of the cross-sections of two intermeshing screws are shown in FIGS. 5(A) and (B). It is appreciated from these drawings that the contour of a cross-section of a screw taken at right angles to its axis is made up of a combination of a group of arcs $\widehat{AB}$, $\widehat{CD}$, $\widehat{EF}$ and $\widehat{GH}$ with the axial core as a center and a group of curves $\widehat{BE}$, $\widehat{FD}$, $\widehat{AG}$ and $\widehat{HC}$ determined by a technique of analytical geometry. FIG. 5(A) shows the contour of the cross-section of one screw taken at right angles to its axis in a phase in which the top of one screw flight corresponds with crest b of the cylinder. FIG. 5(B) shows a similar view in which the top of one screw flight is in a somewhat deviated phase from the crest b of the cylinder.

The contour 31 of the inner surface of the cylinder is defined by the specific extruder of this invention. As a result, the distance L between the axial cores O and O' of two screws 30 and 30' is determined. From the fact that the top of one screw flight is in substantial contact with the contour 31 of the cylinder, the outside diameter R of the screw can necessarily be determined.

If in FIG. 5(A), the angle ∠bO'd formed by (1) the straight line c-d forming an angle of 45° with the horizontal axis g-h passing through the axial cores O and O' and (2) the straight line b-O' connecting the crest b of the cylinder to the axial core O' is α/2, then the arc $\widehat{AB}$ can be expressed as an arc having a radius of R/2 with a central angle of α/2 on both sides of straight line O'-c. This arc $\widehat{AB}$ defines the contour of a flight top which makes substantial contact with the inner wall surface of the cylinder.

The arc $\widehat{EF}$ is an arc having a radius of (L−R/2) with a central angle of a α/2 on both sides of straight line e-f which passes through the axial core O' and crosses straight line c-d at right angles thereto. It defines the bottom surface of a screw channel at its deepest position.

Figure 1A:
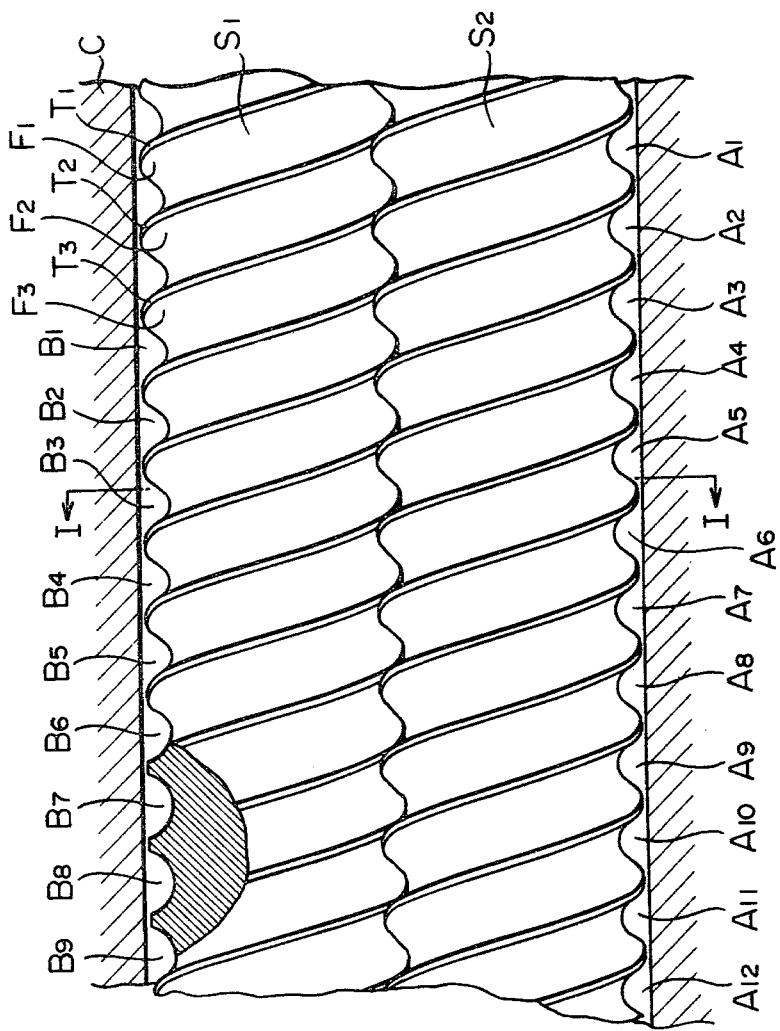
FIG. 1(A) is a top plan, partly in section, of the screw section of a typical known self-cleaning type extruder.

When the tops of two flights are both in substantial contact with the inner wall surface of the cylinder as in a screw of the known type shown in FIGS. 1(A) and (B), the entire contour of the cross-section of the screw taken at right angles to the screw axes is symmetrical with respect to straight line c-d, and can be expressed by the curve A-B-E-F-(D)-J-I-F''-E''-A.

The curves $\widehat{BE}$ and $\widehat{FJ}$ have been found to be expressed by the equation (i) to be given hereinbelow as a result of an analytical geometric study.

On the other hand, the contour of the top of a flight having a tip clearance δ with respect to the inner wall surface of the cylinder is defined by arc $\widehat{CD}$. The arc $\widehat{CD}$ can be expressed as an arc having a central angle ∠CO'D when a circle with a radius (½R−δ) is drawn about O' as a center and the intersection between the circle and the curve $\widehat{FJ}$ is designated D. The central angle ∠CO'D can be determined as follows. Let the point at which the circle having a radius (½R−δ) crosses the straight line a-b connecting the crests a and b of the cylinder beyond point D be k, then the central angle ∠CO'D can be determined by assuming that the angle ∠CO'd=angle ∠kO'd.

The arc GH is an arc having a radius of (L−R/2+δ). The angle ∠GO'f equals angle ∠CO'd, and angle HO'f equals angle ∠DO'd.

The curves $\widehat{AG}$ and $\widehat{HC}$ are expressed by the following equation (i).

The contours of the cross section of the screws taken at right angles to their axes can be determined in the manner described hereinabove, and this determines the structure of the screws used in this invention.

The equation (i) can be formulated in the following manner by referring to FIG. 5(B) which shows the state of FIG. 5(A) shifted in phase by an angle φ. In FIGS. 5(A) and (B), the cross-sectional contours of the two screws are the same, and the same parts are indicated by the corresponding single-primed reference numerals.

A bisecting line c'-d' of the vertical angle A'OB' of a screw flight of screw 30 the top of which is in substantial contact with the inner wall surface of the cylinder is drawn, and made a reference line. If the distance from the axial core O to the contour of screw 30 in its cross section taken perpendicularly of its axis is r* at a point displaced from this reference line by an angle $\text{Ⓗ}$, the following equation can be set up.

$$r^* \sin \epsilon = Rh \sin(\theta - \phi - \omega i)$$

$$Rh \cos(\theta - \phi - \omega i) + r^* \cos \epsilon = L$$

$$\text{Ⓗ} = \theta + \alpha/2 + \phi - \epsilon$$

wherein $$Rh = \tfrac{1}{2}R - \delta,$$

$\theta$ = the intermeshing angle formed by the straight line b-O connecting the crest b of the cylinder to the axial core O and the horizontal axis g-h, $\epsilon$ = the horizontal angle formed by the straight line D-O connecting the contact point of the two screws to the axial core O and the horizonal axis g-h, $\alpha$ = the vertical angle of the flight formed by the straight lines A'-O and B'-O (or A-O' and B-O') connecting the axial core O (or O') to the tops A' and B' (or A and B) of screw flights the tops of which in substantial contact with the inner wall surface of the cylinder, $\phi$ = the angle $\angle bOA'$ which is the angle of rotation of the apex A' of the screw flight from the crest b of the cylinder, and $\omega i$ = the angle resulting from subtracting $\alpha/2$ from the angle formed by the straight line connecting the apex C' or D' (or C or D) of the screw flight having a tip clearance to the axial core O (or O') and the reference line c'-d' (or c-d).

From the above equation, r* at any given angle $\text{Ⓗ}$ can be determined. If r* is plotted at varying $\text{Ⓗ}$ in a system of rectangular coordinates with r* on the ordinate and $\text{Ⓗ}$ on the abscissa, curves $\widehat{BE}$, $\widehat{FD}$, $\widehat{AG}$, $\widehat{HC}$ of the contour of a screw in the cross-section thereof taken at right angles to its axis can be drawn.

The curves $\widehat{BE}$, $\widehat{FD}$, $\widehat{AG}$ and $\widehat{HC}$ of the contour of the screw obtained in this way can be represented by the following equation (i).

$$\frac{r^*}{f(R,\delta)} = \sqrt{4g(R,\delta)\cos^2\theta - \sin^2\left[\left(1 - \frac{1}{m}\right)\pi + \left(\frac{\alpha}{2} + \omega i\right) + \text{Ⓗ}\right]} - \cos\left[\left(1 - \frac{1}{m}\right)\pi + \left(\frac{\alpha}{2} + \omega i\right) + \text{Ⓗ}\right] \quad \text{(i)}$$

wherein
R = the outside diameter of the screw,
m = the number of flights in the screw,
$\delta$ = the tip clearance of the screw flight,
$f(R,\delta)$ = the function of R and $\delta$ corresponding to $(R/2 - \delta)$, and
$g(R,\delta)$ = the function of R and $\delta$ corresponding to $$\left(\frac{R}{R - 2\delta}\right)^2.$$

POSSIBILITY OF INDUSTRIAL UTILIZATION

Since the extruder of the invention described above is designed in such a shape that at least one of the multiple flights of the screw has a tip clearance with respect to the cylinder, it can achieve a unique kneading action in compounding plastics.

This unique kneading action is described by reference to FIGS. 2(A) and (B). The resin fed, for example, into the screw channel $C_1$ of screw 1' is moved past the low screw flight 5' through the tip clearance between it and the inner wall surface of the cylinder by the pushing action of the screw flight 3' in the left direction, and is associated with the resin present in the adjacent channel $C_2$. With the rotation of the screw, a flow of the resin shown by the arrow $X_1$ in FIG. 2(A) takes place by the friction of the resin with the inner surface of the cylinder.

The resin which flows upward in the direction of the arrow $Y_1$ along the channel $C_1$ separates at the point of intermeshing between the screws 1 and 1' into a flow that moves through a normal route in the direction $Z_1$ along screw channel $D_2$ and a flow that moves to screw channel $D_3$ past the top 6' of the low screw flight 5' and thus advances in the direction shown by arrow $Z_2$.

The resin which has moved into the screw channel $D_2$ is kneaded with the resin present in the screw channel $D_1$ adjacent thereto via the low screw flight 5 by the interchannel flow in the direction shown by arrow $X_2$.

The resin which has moved to channel $D_3$ of the screw 1 from the screw channel $C_1$ of screw 1' is likewise kneaded with the resin present in the channel $D_4$ adjacent thereto via the low screw flight 5 by the interchannel flows shown by arrows $X_3$ and $X_4$.

Thus, unlike the known self-cleaning type extruders, the extruder of the present invention can achieve an intensive kneading of the resin by the exchanging of resin flows between channels of the same screw and between channels of two intermeshing screws.

In addition, the resin is circulated between adjacent channels through the tip clearance of the flight as shown, for example, by arrows $X_1$, $X_2$, $X_3$ and $X_4$. Accordingly, the resin undergoes a high shearing action because of the narrow tip clearance. When an unmelted resin or a high viscosity resin is present together in the channels, the tip clearance performs a filter action to make the melt viscosity of the resin highly uniform. In particular, in the extruder of the type shown in FIG. 3, the amount of the resin which undergoes such a shearing action and the time during which it undergoes such a shearing action can both be maximized, and the screw channels have a configuration close to that in conventional single-screw machines. The screw channels of the type shown in FIG. 3 give a channel configuration factor which permits a high efficiency of conveyance, and can give a very high total shear for a fixed rate of extrusion.

As described hereinabove, the extruder of the invention can effect uniform and intensive kneading and mixing of resin.

What we claim is:

1. A self-cleaning type extruder comprising: a cylinder and at least two screws therein, the screw flights of which rotate in the same direction, said screws being in such a relation that at any position in at least a part of the screws which lies in the longitudinal direction of the extruder, the contour of one screw in a cylinder cross-section taken at right angles to the screw axes is in substantial contact at one point with the contour in the same cross-section of another screw intermeshing therewith, each of said screws having at least two screw flights, and the top of at least one of the screw flights being substantially in contact with the inner wall surface of the cylinder and the top of at least one other screw flight having the tip spaced at a predetermined constant clearance $\delta$ from the wall surface of the cylinder, said tip clearance $\delta$ being a value in the range according to the equation $$R/100 \leqq \delta \leqq H/2$$

wherein R is the outside diameter of the screw determined by doubling the maximum vertical distance from the top of the screw flight to the central axis of the screw, and H is the depth of a screw channel defined by R-L in which L is the interaxial distance of the two intermeshing screws; and in the contour of one screw in the cross-section taken at right angles to the screw axes at any portion, the part of the contour formed by the top of one screw flight in substantial contact with the inner wall surface of the cylinder is an arc with the central axis of the screw as a center and a radius of R/2 and the part of the contour formed by the top of the other screw flight having the predetermined tip clearance $\delta$ with respect to the inner wall surface of the cylinder is an arc with the central axis of the screw as a center and a radius of R/2−$\delta$; and the central axis of the screw corresponds with the axis of rotation of the screw.

2. The extruder of claim 1 wherein each of the screws has 2 to 4 screw flights.

3. The extruder of claim 1 wherein each of the screws has two or three independent screw flights, and the top of only one of them has a predetermined tip clearance with respect to the inner wall surface of the cylinder.

4. The extruder of claim 1 wherein the tip clearance $\delta$ is a predetermined value in the range according to the equation $$R/50 \leqq \delta \leqq H/2$$

wherein R and H are as defined in claim 1.

5. The extruder of claim 1 wherein each of the screws has two screw flights, and the two screw flights together have the structure of an integrated screw flight having a flight top in substantial contact with the inner wall surface of the cylinder and a plateau along only one side of the cross-sectional profile of the screw flight spaced from the inner wall surface by a predetermined tip clearance.

* * * * *